(12) United States Patent
Hodgson et al.

(10) Patent No.: US 11,549,279 B2
(45) Date of Patent: Jan. 10, 2023

(54) PANEL SYSTEMS AND COMPONENTS

(71) Applicant: TOMM TECH PTY LTD, Perth (AU)

(72) Inventors: Thomas Hodgson, Bunbury (AU); Riley Hodgson, Bunbury (AU)

(73) Assignee: TOMM TECH PTY LTD, Bunbury (AU)

( * ) Notice: Subject to any disclaimer, the term of this patent is extended or adjusted under 35 U.S.C. 154(b) by 330 days.

(21) Appl. No.: 16/207,682

(22) Filed: Dec. 3, 2018

(65) Prior Publication Data

US 2019/0136573 A1    May 9, 2019

Related U.S. Application Data

(63) Continuation of application No. PCT/AU2017/050544, filed on Jun. 3, 2017.

(30) Foreign Application Priority Data

Jun. 3, 2016   (AU) ................................. 2016902172
May 4, 2017   (AU) ................................. 2017901618
May 4, 2017   (AU) ................................. 2017901619

(51) Int. Cl.
*E04H 17/14* (2006.01)
*E04F 11/18* (2006.01)

(52) U.S. Cl.
CPC ...... *E04H 17/1417* (2013.01); *E04F 11/1817* (2013.01); *E04F 2011/1823* (2013.01); *E04F 2011/1827* (2013.01)

(58) Field of Classification Search
CPC ............ E04H 17/1426; E04H 17/1447; E04H 17/1469; E04H 17/14; E04H 17/1417; E04F 11/1817; E04F 2011/1821; E04F 2011/1827; E04F 2011/1823; E04F 2011/1825; E04F 2011/1829
USPC ................................ 256/65.01, 65.02, 65.08
See application file for complete search history.

(56) References Cited

U.S. PATENT DOCUMENTS

| 3,498,589 A | 3/1970 | Murdock |
| 4,014,520 A * | 3/1977 | Walters ............... E04F 11/1817 256/22 |
| 4,073,477 A * | 2/1978 | Walters ............... E04F 11/1817 256/22 |
| 4,725,044 A * | 2/1988 | Cluff .................... E04H 17/066 245/11 |

(Continued)

FOREIGN PATENT DOCUMENTS

| AU | 2009100361 A4 | 5/2009 |
| AU | 2017200366 A1 | 8/2017 |

(Continued)

OTHER PUBLICATIONS

Australian Patent Office International Search Report for co-pending AU2017/050544, 7 pages, dated Sep. 4, 2017.

*Primary Examiner* — Josh Skroupa
*Assistant Examiner* — Kevin J Baynes
(74) *Attorney, Agent, or Firm* — Kagan Binder, PLLC (57) ABSTRACT

A panel assembly includes two frame members and a plurality of panels extending between the frame members. Each panel has fastening elements at either end. The fastening elements are arranged to clip onto mating portions of the frame members, and are also arranged to frictionally engage internal surfaces of the panels to thereby hold the panels relative to the frame members.

9 Claims, 6 Drawing Sheets

(56) References Cited

U.S. PATENT DOCUMENTS

| | | | | |
|---|---|---|---|---|
| 4,950,098 A * | 8/1990 | Abbott | B21F 29/02 | 245/11 |
| 4,995,591 A * | 2/1991 | Humphrey | B21F 29/02 | 256/19 |
| 5,234,199 A * | 8/1993 | Cluff | E04H 17/066 | 245/11 |
| 5,275,381 A * | 1/1994 | Cluff | B21F 9/02 | 24/336 |
| 5,313,761 A * | 5/1994 | Leopold | E06B 3/6675 | 52/456 |
| 5,651,534 A * | 7/1997 | Yoder | E04H 12/2215 | 256/66 |
| 5,678,376 A * | 10/1997 | Poma | E06B 3/667 | 24/453 |
| 5,873,564 A * | 2/1999 | Bisch | E04H 17/1447 | 256/65.12 |
| 6,631,887 B1 * | 10/2003 | Walmsley | E04H 17/1439 | 256/22 |
| 6,971,831 B2 | 12/2005 | Fattori | F16B 21/082 | 411/508 |
| 7,232,114 B2 * | 6/2007 | Platt | E04H 17/1413 | 256/65.04 |
| 7,475,870 B2 * | 1/2009 | Platt | E04F 11/1834 | 256/67 |
| 7,685,782 B2 * | 3/2010 | Pettit | E06B 3/667 | 52/204.61 |
| 7,716,885 B2 * | 5/2010 | Reichert | E06B 3/6604 | 52/204.61 |
| 7,748,686 B1 | 7/2010 | Harder | | |
| 8,001,742 B2 * | 8/2011 | Briese | E06B 3/6675 | 52/656.8 |
| 8,113,489 B1 * | 2/2012 | Harder | E04F 11/1834 | 256/67 |
| 9,027,909 B1 * | 5/2015 | Peyton | E04H 17/1439 | 256/67 |
| 9,556,641 B2 * | 1/2017 | Milanowski | E04F 11/1842 | |
| 10,060,136 B2 * | 8/2018 | Milanowski | E04F 11/1842 | |
| 2002/0079482 A1 | 6/2002 | Strome | | |
| 2003/0201432 A1 * | 10/2003 | Norman | E04F 11/1817 | 256/65.08 |
| 2004/0123557 A1 * | 7/2004 | Hornung | E06B 3/6675 | 52/786.13 |
| 2005/0098771 A1 * | 5/2005 | DeMaere | E04H 17/168 | 256/65.02 |
| 2007/0158630 A1 * | 7/2007 | Lo | E04F 11/181 | 256/59 |
| 2009/0173926 A1 * | 7/2009 | Timothy | E04F 11/181 | 256/65.02 |
| 2009/0272957 A1 * | 11/2009 | Nelson | E04F 11/1817 | 256/65.01 |
| 2011/0024060 A1 | 2/2011 | Brownbill | | |
| 2011/0127482 A1 | 6/2011 | Lo | | |
| 2015/0097151 A1 | 4/2015 | Toglia et al. | | |
| 2015/0102277 A1 * | 4/2015 | Milanowski | E04F 11/1842 | 256/65.02 |
| 2015/0115214 A1 * | 4/2015 | Schneider | E04F 11/1844 | 256/67 |
| 2015/0252588 A1 | 9/2015 | Springborn | | |

FOREIGN PATENT DOCUMENTS

| | | | | |
|---|---|---|---|---|
| DE | 202015005204 U1 | 12/2015 | | |
| EP | 2682614 | 1/2014 | | |
| FR | 2034361 A1 * | 12/1970 | | E04F 11/1836 |
| FR | 2250877 A1 * | 6/1975 | | E04F 11/1817 |

\* cited by examiner

PANEL SYSTEMS AND COMPONENTS

PRIORITY CLAIM

This application is a continuation of International Application No. PCT/AU2017/050544, filed Jun. 3, 2017, which in turn claims priority to Australian Patent Application No. 2016902172, filed Jun. 3, 2016, Australian Patent Application No. 2017901618, filed May 4, 2017, and Australian Patent Application No. 2017901619, filed May 4, 2017, the disclosures of which are incorporated herein by reference in their entireties for all purposes.

FIELD OF THE INVENTION

The present invention relates to panel systems such as fences, gates and balustrades.

BACKGROUND TO THE INVENTION

Panel systems for are used for a variety of screening purposes, including fences, gates, balustrades and the like. Such panel systems generally incorporate a frame having an upper frame member and a lower frame member, with panels or slats extending between the frame members in order to complete the panel system.

Often, panels are fixed with fasteners such as screws or rivets. There are several problems associated with this. Generally, each panel must be independently fastened into position, which is a time consuming process. If there is any problem in alignment of panels with fixing holes then damage to the panel is likely. In addition, during the life of the panel system it is common for fasteners to become loose, leading to rattling of panels or even the loss of panels from the system.

Other known methods of fixing panels involve some sort of clamping or other frictional engagement with the outside of a panel. This fixing will often cause scratching or other damage to the outside of the panel, making the panel unable to be reused. Damage to visible portions of the outside of the panel can occur during a mistake in assembly, making it common for damage to be visible in the final assembled product.

It is against this background that the present invention has been developed.

SUMMARY OF THE INVENTION

According to one aspect of the present invention there is provided a panel assembly comprising a frame member and a plurality of panels, each panel having a corresponding fastening element for connecting the panel to the frame member, the frame member having a mating portion; the panels being elongate and being at least partially hollow, the panels having internal walls; the fastening element having a frame engaging portion arranged to engage with the mating portion of the frame member and a panel engaging portion arranged to engage with the internal walls of a panel, wherein the panel engaging portion is arranged to provide a frictional force between the fastening element and the internal walls of a panel in order to impede relative movement of the fastening element and the panel.

The panel assembly may be a screen such as a fence, a gate, or a balustrade.

It is preferred that the panel engaging portion acts against the panel along a line generally perpendicular to a longitudinal direction of the panel.

In a preferred embodiment the fastening element comprises a central body portion, and the panel engaging portion comprises at least two bearing members which extend laterally of the central body portion. The bearing members may be flanges each having an elongate outer edge arranged to bear against an internal wall of the panel.

The mating portion of the frame member may be comprised of longitudinally extending rails, with the frame engaging portion of the fastening element being complementary in shape to an upper edge of the longitudinally extending rails.

It is preferred that the longitudinally extending rails include internally facing clip portions located on the upper edges thereof, and the fastening element includes outwardly facing clip portions forming the frame engaging portion.

The frame member may include a plurality of openings along one edge thereof, each opening arranged to receive a fastening element therein.

In accordance with a second aspect of the present invention there is provided a fastening element for connecting a panel to a frame member, the fastening element having a frame engaging portion arranged to engage with the mating portion of the frame member and a panel engaging portion arranged to engage with the internal walls of the panel, wherein the panel engaging portion is arranged to provide a frictional force between the fastening element and the internal walls of the panel in order to impede relative movement of the fastening element and the panel.

A fastening element may comprise a central body portion, and the panel engaging portion may comprise at least two bearing members which extend laterally of the central body portion. Preferably, the central body portion is a web.

The bearing members may be flanges each having an elongate outer edge arranged to bear against an internal wall of the panel.

It is preferred that the fastening element includes outwardly facing clip portions forming the frame engaging portion.

The fastening element preferably has a substantially constant cross section along its length. In a preferred embodiment, the fastening element can be formed as an extrusion cut into desired lengths.

BRIEF DESCRIPTION OF THE DRAWINGS

It will be convenient to further describe the invention with reference to preferred embodiments of the present invention. Other embodiments are possible, and consequently the particularity of the following discussion is not to be understood as superseding the generality of the preceding description of the invention. In the drawings.

DETAILED DESCRIPTION OF PREFERRED EMBODIMENTS

Figure 1:
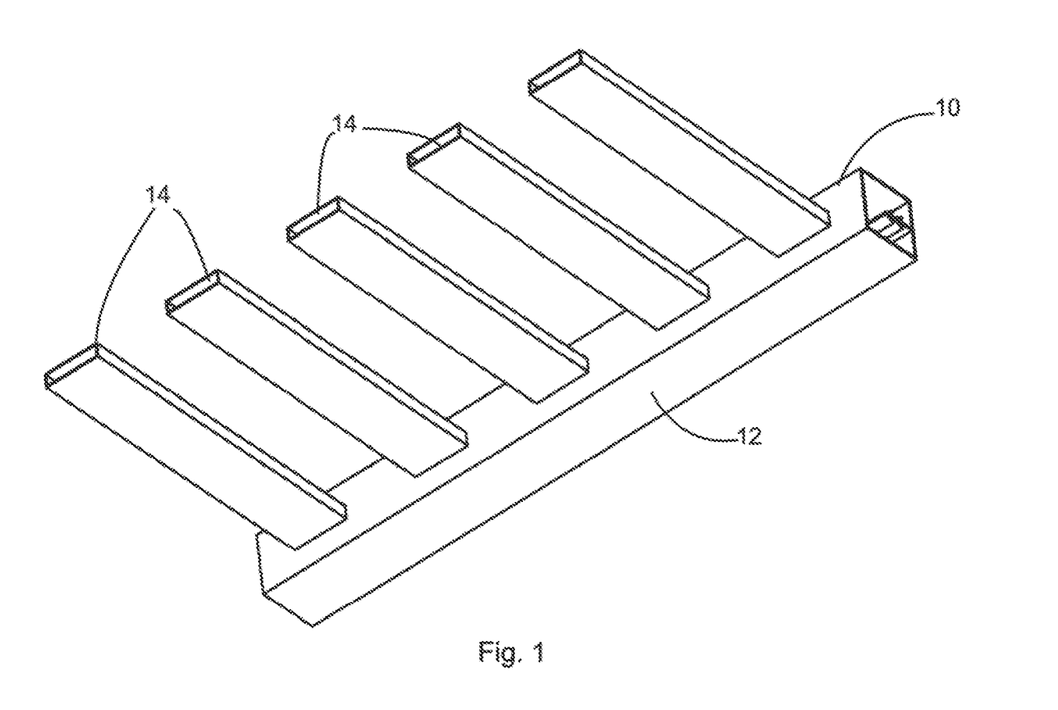
FIG. 1 is a perspective of a portion of a panel assembly in accordance with some aspects of the present invention.

Referring to the Figures, FIG. 1 shows a portion of a panel assembly 10. The panel assembly 10 includes a lower frame member 12, from which a plurality of panels 14 extend. It will be appreciated that the panel assembly 10 can be completed by an upper frame member being a mirror image of the lower frame member 12.

Figure 2:
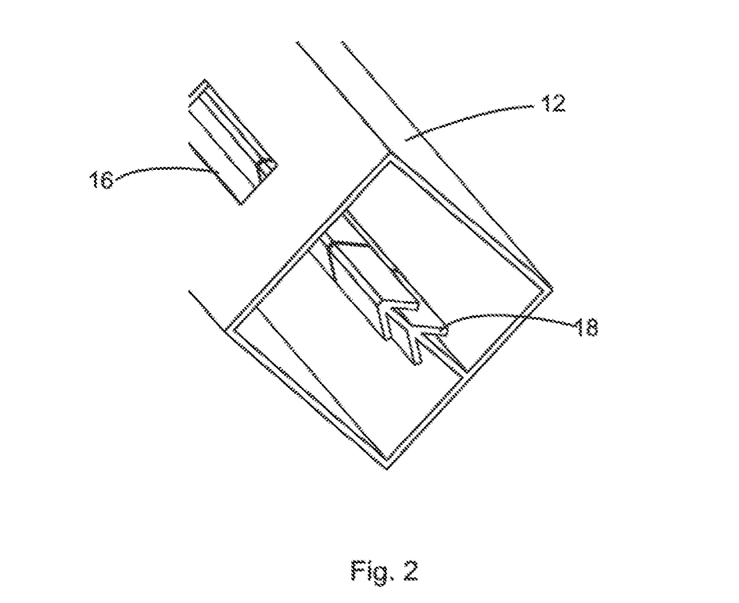
FIG. 2 is an end view of a frame member of the panel assembly of FIG. 1.

The lower frame member 12 can be seen in FIG. 2. It is elongate, having a generally square cross section. Rectangular apertures 16 are spaced along its upper surface, each sized to receive a panel 14.

A plurality of integrally formed fastening elements 18 are spaced along a lower surface of the lower frame member 12, corresponding with each rectangular aperture 16. The fastening elements 18 are arranged to engage with an internal surface of a corresponding panel 14, as will be described in greater detail below.

FIGS. 3 to 8 show a preferred panel assembly 20. The panel assembly 20 includes a frame member 22, together with panels similar to the panels 14 and an upper frame similar to the frame member 22. The principle difference between the panel assembly 20 of FIGS. 3 to 8 and the panel assembly 10 of FIGS. 1 and 2 is that the panel assembly 20 includes a plurality of distinct fastening elements 24.

Figure 3:
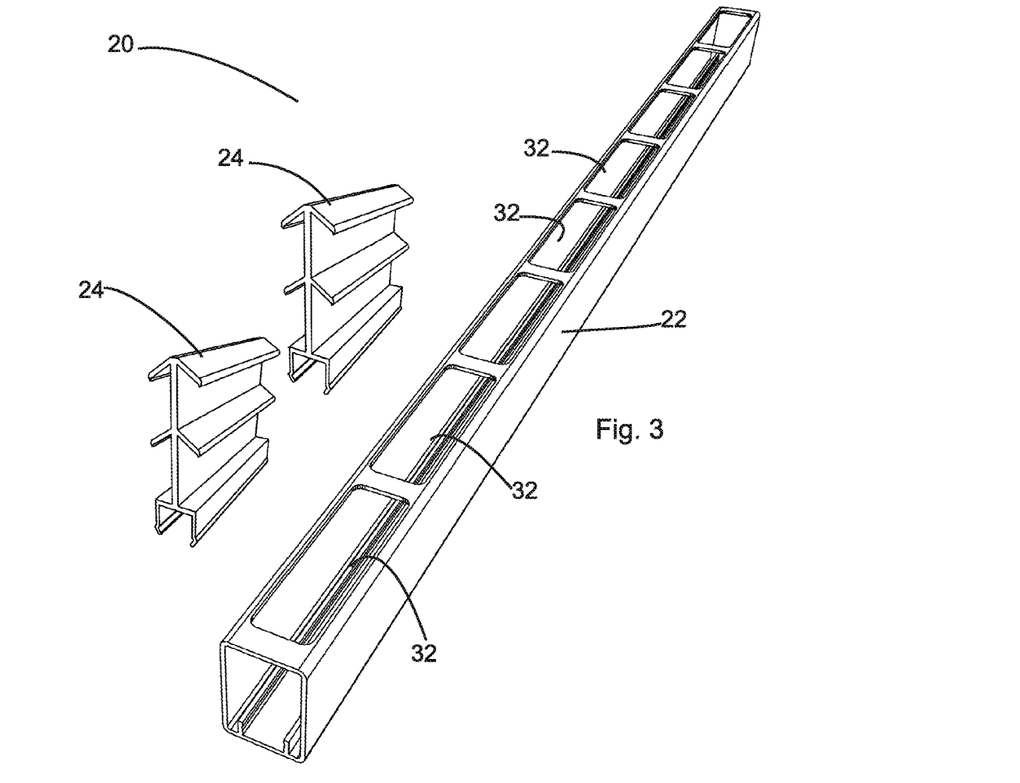
FIG. 3 is a perspective of elements of a panel assembly in accordance with a first embodiment of the present invention.
Figure 4:
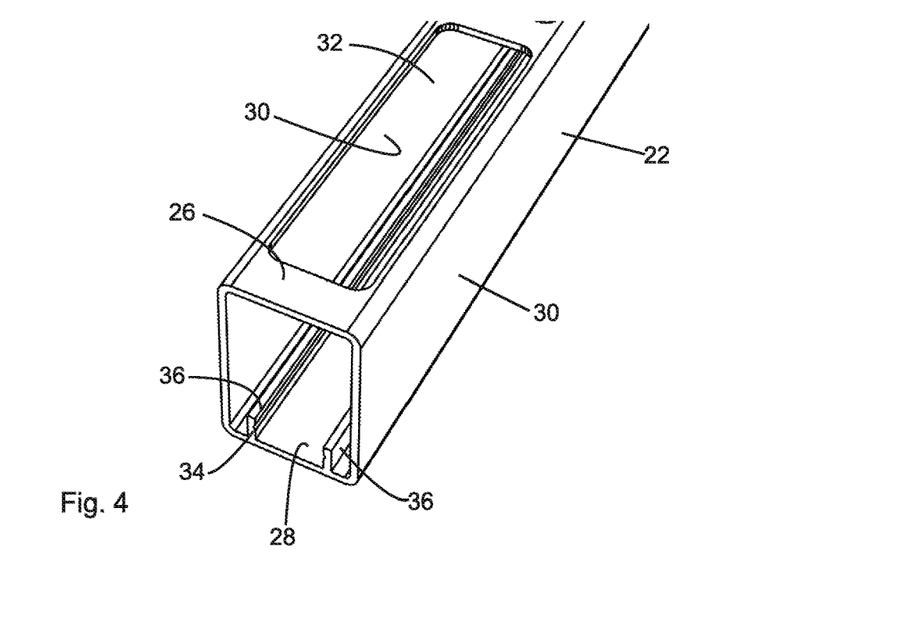
FIG. 4 is a close view of an end of a frame member from the panel assembly of FIG. 3.
Figure 8:
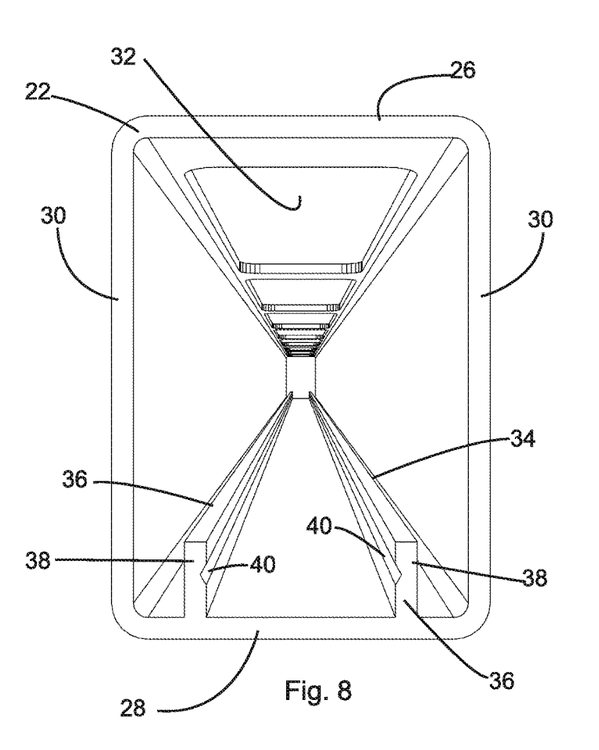
FIG. 8 is an end view of the frame member of FIG. 4.

Each frame member 22 is generally rectangular in cross section, with the frame member 22 having an upper edge 26, a lower edge 28, and two side edges 30. The upper edge 26 includes a plurality of rectangular apertures 32 spaced along its length, sized and shaped to receive hollow panels (not shown) with a small clearance about each panel.

The lower edge 28 of the frame member 22 has a mating portion 34 extending along an internal surface thereof, oriented towards the upper edge 26. The mating portion 34 comprises two longitudinally extending rails 36, spaced apart from each other. Each of the rails 36 in this embodiment is comprised of an upwardly projecting wall 38 parallel to the side edges 30 of the frame member 12, the wall 38 having an elongate indent 40 on an internal side thereof.

Figure 5:
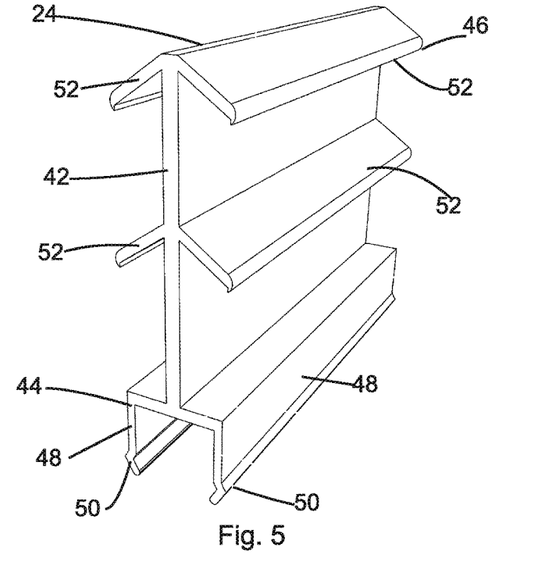
FIG. 5 is a perspective of a fastening element from the panel assembly of FIG. 3.
Figure 6:
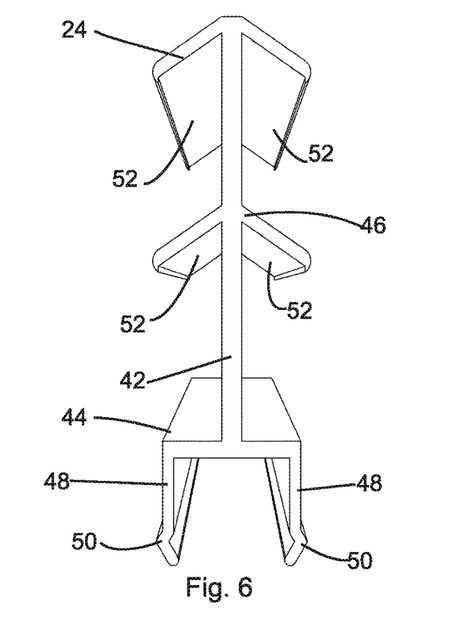
FIG. 6 is an end view of the fastening element of FIG. 5.
Figure 7:
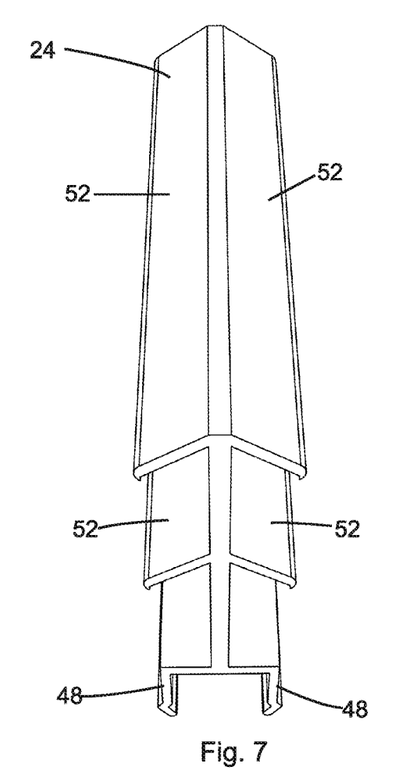
FIG. 7 is an upper perspective of the fastening element of FIG. 5.

A fastening element 24 can be seen in detail in FIGS. 5 to 7. The fastening element 24 has a central body portion 42 from which two parts extend: a frame engaging portion 44 at a lower end of the central body portion 42 and a panel engaging portion 46 at an upper end of the central body portion 42. The central body portion 42 is formed as a web which extends along the length of the fastening element 24.

The frame engaging portion 44 is formed as two L-shaped legs which extend from a lower end of the central body portion 42. The frame engaging portion 44 has two side walls 48 which are parallel to the central body portion 42, and spaced from each other. The arrangement is such that the side walls 48 are spaced from each other by the same distance as the spacing between the rails 36 of the frame member 22.

The side walls 48 each have an outwardly facing protrusion 50 at a lower end thereof. The protrusion 50 is formed as an elongate 'kink' at a lower end of each side wall 48. The arrangement is such that when a fastening element 24 is lowered onto a mating portion 34 of the frame member 22, the side walls 48 of the frame engaging portion 44 flex inwardly as the walls 38 of the rails 36 flex outwardly, allowing the fastening element 24 to move downward until the protrusions 50 of the fastening element 24 locate within the indents 40 of the mating portion 34. It will be appreciated that this works in practice as a 'click' into place function.

The panel engaging portion 46 comprises flanges 52 which extend away from the central body portion 42 at a downwards angle of about 30 degrees. In the embodiment of the drawings there are two flanges 52 on each side of the central body portion 42, although it will be appreciated that the number of flanges on each side can be readily varied. Each flange 52 has an elongate outer edge 54 which is parallel to the protrusions 50.

The flanges 52 are sized such that when a panel is located around the fastening element 24, the flanges 52 will bear against an internal wall of the panel and provide a frictional force between the fastening element 24 and the panel. It will be appreciated that the frictional force will act in a line generally parallel to the longitudinal direction of the frame member 22; that is, perpendicular to a longitudinal direction of the panel.

The fastening element 24 is of uniform cross-sectional shape. In a preferred embodiment of the invention, the fastening element is formed by aluminum extrusion which is cut to form fastening elements 24 of a required length The length of each fastening element 24 is set to be slightly less than the width of a panel. This means that each fastening element 24 is sized to be receivable through an aperture 32 in the frame member 22.

In order to form a panel assembly, a fastening element 24 is introduced into each aperture 32 of both an upper frame member 22 and a lower frame member 22. The fastening elements 24 are each clicked into place over the mating portion 34 of the relevant frame member. A panel can then be inserted into each aperture 32 of the lower frame member 22, around the panel engaging portion 46 of the respective fastening element 24. The panel can be slid into its final position relative to the lower frame member 22, being held in position by frictional engagement between the flanges 52 and the internal wall of the panel.

Once all of the panels have been located in the lower frame member 22, the upper frame member 22 can be located appropriately opposed to the lower frame member 22 and slid into position whereby its fastening elements 24 engage with the panels and hold them in position.

Figure 9:
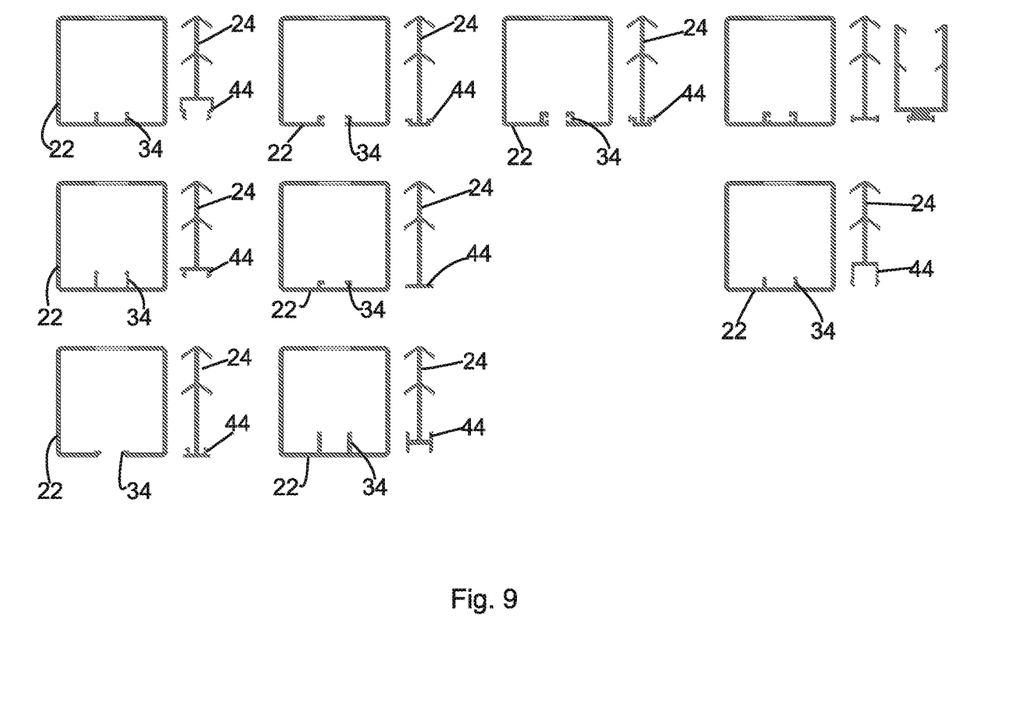
FIG. 9 is a series of cross-sectional views of alternative frame members and fastening elements for panel assemblies similar to that of FIG. 3.

It will be appreciated that various elements of the panel assembly described above can be altered without departing from the scope of the invention. For instance, it is necessary that the shape of the mating portion 34 of the frame member 22 is complementary to that of frame engaging portion 44 of the fastening element 24. The particular shape of these complementary portions can readily be varied. FIG. 9 shows a number of possible variations of the shape of this connection. Other variations are equally possible.

Figure 10:
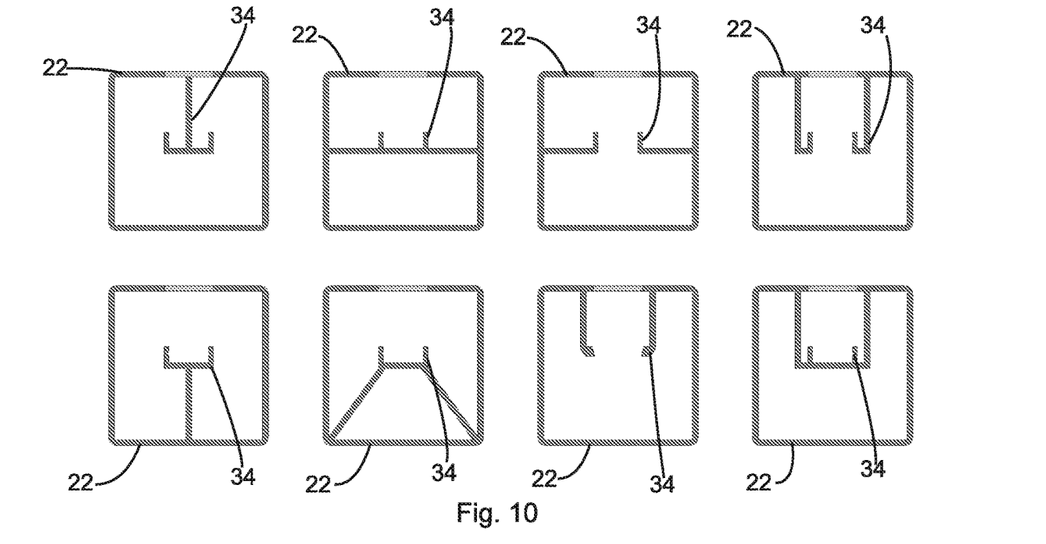
FIG. 10 is a series of cross-sectional views of further alternative frame members for use in panel assemblies in accordance with the present invention.

Similarly, although the panel assembly described above uses rails 36 which extend from the lower edge 28 of the frame member 22, it will be readily apparent that other locations for the mating portion 34 are also possible. FIG. 10 shows a number of possible variations of the location and shape of the mating portion 34. Other variations are, of course, possible.

Figure 11:
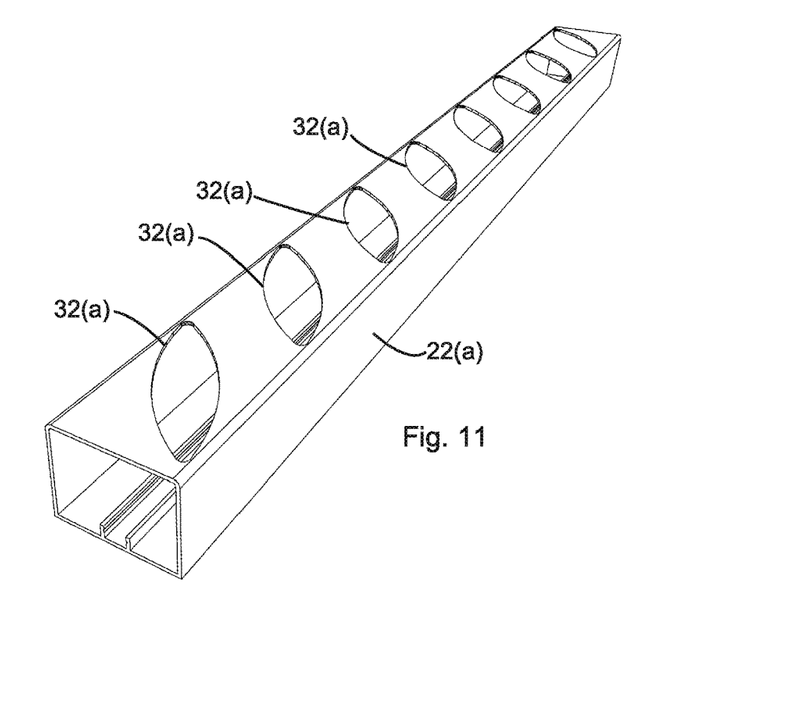
FIG. 11 is a perspective of a frame member in accordance with a further embodiment of the present invention.
Figure 12:
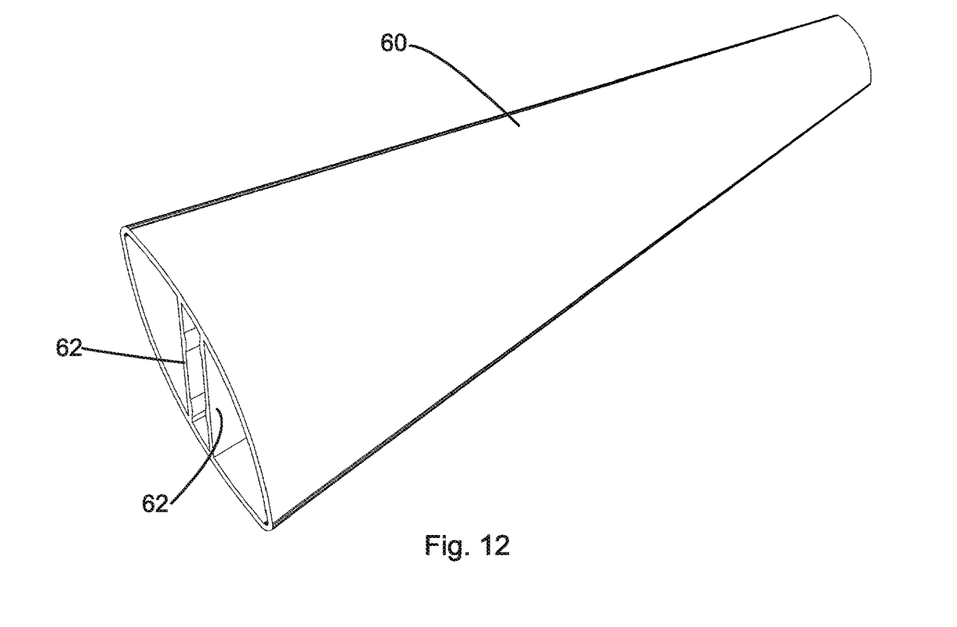
FIG. 12 is a perspective of a panel for use in conjunction with the frame member of FIG. 11.
Figure 13:
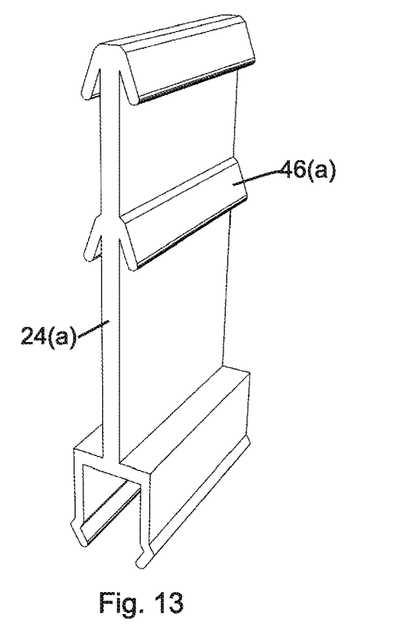
FIG. 13 is a perspective of a fastening element for use with the frame member of FIG. 11.

The assembly described above results in a panel assembly broadly similar in shape to the panel assembly 10 of FIG. 1, with rectangular panels 14 arrayed along the length of the frame member 12. An alternative shape is shown in FIGS. 11 to 13, wherein the panels 60 are curved in shape and the apertures 32(a) in the frame member 22(a) are shaped to receive this curved shape. The curved panels 60 are formed with two parallel internal walls 62 which is arranged to engage with the panel engaging portions 46(a) of the fastening elements 24(a).

Figure 14:
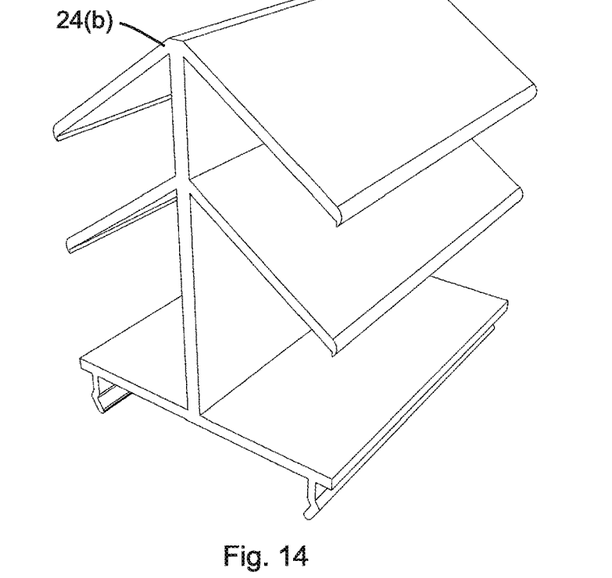
FIG. 14 is a perspective of a fastening element for use in a further embodiment of the present invention.

It will be appreciated that the depth of the panels used can be readily altered with corresponding changes to the size of the fastening element 24, such as shown in the fastening element 24(b) of FIG. 14.

Figure 15:
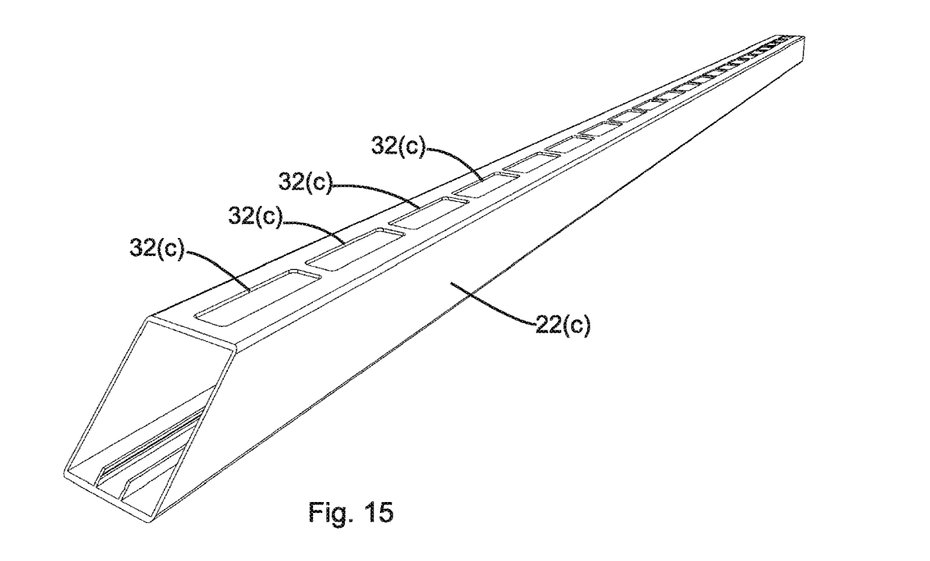
FIG. 15 is a perspective of an alternative embodiment of a frame member for use in the present invention.

Similarly, the width of the panels, and their spacing, can be altered with corresponding changes to the apertures 32, such as the closer spacing of apertures 32(c) in the frame member 22(c) of FIG. 15.

Other modifications and variations as would be apparent to a skilled addressee are deemed to be within the scope of the present invention.

The invention claimed is:

1. A panel assembly in an assembled state, the panel assembly comprising:
   at least one frame member,
   a plurality of panels, and
   a plurality of fastening elements corresponding to the number of panels, each fastening element connecting the panel to the frame member,
   the frame member having a plurality of openings spaced along one edge thereof, each opening having a portion of a panel passing therethrough,
   the frame member having a mating portion oriented towards the said one edge;
   the panels being elongate and being at least partially hollow,
   the panels having internal walls;
   each fastening element having a frame engaging portion engaged with the mating portion of the frame member and a panel engaging portion engaged with the internal walls of a panel,
   the fastening element being sized such that the frame engaging portion is configured to be inserted through one of the said plurality of openings,
   wherein the panel engaging portion provides a frictional force between the fastening element and the internal walls of a panel in order to impede relative movement of the fastening element and the panel, and
   the frame engaging portion provides a physical engagement with the mating portion of the frame member in order to impede relative movement of the fastening element and the frame member.

2. A panel assembly as claimed in claim 1, wherein the panel engaging portion acts against the panel along a line generally perpendicular to a longitudinal direction of the panel.

3. A panel assembly as claimed in claim 1, wherein each fastening element includes a central body portion and the panel engaging portion comprises two bearing members which extend laterally of the central body portion.

4. A panel assembly as claimed in claim 3, wherein the bearing members are flanges each having an elongate outer edge arranged to bear against one of the said internal walls of the panel.

5. A panel assembly as claimed in claim 1, wherein the mating portion of the frame member is comprised of longitudinally extending rails.

6. A panel assembly as claimed in claim 5, wherein the frame engaging portion of the fastening element is complementary in shape to an upper edge of the longitudinally extending rails.

7. A panel assembly as claimed in claim 6, wherein the longitudinally extending rails include internally facing clip portions located on the upper edges thereof.

8. A panel assembly as claimed in claim 7, wherein the fastening element includes outwardly facing clip portions forming the frame engaging portion.

9. A panel assembly as claimed in claim 1, wherein the panel assembly is a fence, a gate, or a balustrade.

* * * * *